United States Patent
Sarkar et al.

(10) Patent No.: US 9,699,594 B2
(45) Date of Patent: Jul. 4, 2017

(54) MOBILE USER DEVICE AND METHOD OF COMMUNICATION OVER A WIRELESS MEDIUM

(71) Applicant: Plantronics, Inc., Santa Cruz, CA (US)

(72) Inventors: Shantanu Sarkar, San Jose, CA (US); Timothy P Johnston, Los Gatos, CA (US); Cary Bran, Seattle, WA (US); Joe Burton, Los Gatos, CA (US)

(73) Assignee: Plantronics, Inc., Santa Cruz, CA (US)

( * ) Notice: Subject to any disclaimer, the term of this patent is extended or adjusted under 35 U.S.C. 154(b) by 0 days.

(21) Appl. No.: 14/633,686

(22) Filed: Feb. 27, 2015

(65) Prior Publication Data
US 2016/0255459 A1 Sep. 1, 2016

(51) Int. Cl.
*H04W 4/00* (2009.01)
*H04W 12/04* (2009.01)
*H04W 84/18* (2009.01)

(52) U.S. Cl.
CPC ............ *H04W 4/008* (2013.01); *H04W 12/04* (2013.01); *H04W 84/18* (2013.01)

(58) Field of Classification Search
CPC .............................. H04W 4/008; H04W 12/06
USPC ........................................................ 455/41.1
See application file for complete search history.

(56) References Cited

U.S. PATENT DOCUMENTS

| | | | | |
|---|---|---|---|---|
| 5,983,093 A * | 11/1999 | Haimi-Cohen | ....... | H04W 12/12 455/410 |
| 6,016,476 A * | 1/2000 | Maes | ................... | G06Q 20/108 705/18 |
| 6,715,679 B1 * | 4/2004 | Infosino | ............... | G06Q 20/105 235/380 |
| 7,216,365 B2 * | 5/2007 | Bhagwat | ............. | H04L 12/2602 370/395.3 |
| 7,805,382 B2 * | 9/2010 | Rosen | .................... | G06Q 10/10 705/321 |
| 7,877,610 B2 * | 1/2011 | Vanstone | .............. | H04L 9/3247 713/168 |
| 7,881,732 B2 * | 2/2011 | Newville | ........... | G06Q 30/0207 455/41.2 |
| 7,912,222 B2 * | 3/2011 | Hagiwara | ................. | H04L 9/32 380/247 |
| 7,979,054 B2 * | 7/2011 | Baysinger | ............. | H04L 63/083 380/247 |
| 8,009,874 B2 * | 8/2011 | Brown | .................... | H04M 1/05 382/115 |
| 8,041,335 B2 * | 10/2011 | Khetawat | ............. | H04L 63/104 455/404.1 |

(Continued)

*Primary Examiner* — Hai V Nguyen
(74) *Attorney, Agent, or Firm* — Dienwiebel Transatlantic IP

(57) ABSTRACT

A mobile user device, configured to communicate over a wireless medium and a corresponding computer-implemented method is described. The mobile user device in one embodiment may comprise a near field communication interface for at least sending response information to a receiver in one or more near field transmissions; and a communication control module, connected with said near field communication interface. To improve the security of the mobile user device, the communication control module is configured to control whether said response information is sent by said near field communication interface in dependence of at least a communication safety parameter.

19 Claims, 7 Drawing Sheets

(56) References Cited

U.S. PATENT DOCUMENTS

| | | | | |
|---|---|---|---|---|
| 8,116,679 B2* | 2/2012 | Dunko | H04W 4/001 | 455/41.1 |
| 8,265,600 B2* | 9/2012 | Baysinger | H04L 63/083 | 380/247 |
| 8,295,857 B2* | 10/2012 | Newville | G06Q 30/0207 | 455/41.2 |
| 8,339,268 B2* | 12/2012 | Deng | G08B 21/06 | 340/575 |
| 8,423,601 B2* | 4/2013 | Tobita | H04L 67/02 | 709/202 |
| 8,688,146 B2* | 4/2014 | Grube | H04W 4/22 | 455/456.3 |
| 8,693,660 B2* | 4/2014 | Bhow | H04L 12/1818 | 379/158 |
| 8,744,347 B2* | 6/2014 | Charrat | G06Q 20/341 | 455/41.1 |
| 8,769,304 B2* | 7/2014 | Kirsch | G06Q 20/0855 | 380/30 |
| 8,769,657 B2* | 7/2014 | Zaitsev | G06F 21/123 | 726/17 |
| 8,818,272 B2* | 8/2014 | Paryani | H04B 1/202 | 455/404.1 |
| 8,831,677 B2* | 9/2014 | Villa-Real | H04M 1/66 | 455/552.1 |
| 8,878,670 B2* | 11/2014 | Rosen | G08B 21/18 | 235/375 |
| 8,893,234 B2* | 11/2014 | Morel | H04W 12/06 | 340/5.31 |
| 8,934,839 B2* | 1/2015 | Singh | H04W 4/008 | 340/539.12 |
| 8,948,790 B1* | 2/2015 | Kim | H04W 4/008 | 455/41.1 |
| 8,954,030 B1* | 2/2015 | Buchheit | A61N 1/3925 | 455/404.1 |
| 9,014,661 B2* | 4/2015 | deCharms | H04W 4/021 | 348/14.02 |
| 9,058,079 B1* | 6/2015 | Schneider | G06F 3/0416 | |
| 9,066,197 B2* | 6/2015 | Kiukkonen | H04W 52/0229 | |
| 9,094,522 B2* | 7/2015 | Bhow | H04L 12/1818 | |
| 9,100,426 B1* | 8/2015 | Fang | G06F 21/50 | |
| 9,137,662 B2* | 9/2015 | Holtmanns | H04L 63/0892 | |
| 9,161,329 B2* | 10/2015 | Finlow-Bates | H04W 64/00 | |
| 9,176,543 B2* | 11/2015 | Faith | G06F 1/1694 | |
| 9,197,671 B1* | 11/2015 | Bartoszewski | H04L 63/20 | |
| 9,237,445 B1* | 1/2016 | Wu | H04B 7/15557 | |
| 2002/0183005 A1* | 12/2002 | Yi | H04L 63/0428 | 455/41.1 |
| 2003/0025603 A1* | 2/2003 | Smith | G06F 21/35 | 340/572.8 |
| 2003/0151513 A1* | 8/2003 | Herrmann | G08B 25/003 | 340/573.1 |
| 2005/0287971 A1* | 12/2005 | Christensen | G06Q 30/0267 | 455/186.1 |
| 2006/0229896 A1* | 10/2006 | Rosen | G06Q 10/1053 | 705/321 |
| 2006/0242404 A1* | 10/2006 | Su | G06Q 20/027 | 713/150 |
| 2006/0250272 A1* | 11/2006 | Puamau | G08C 17/02 | 340/12.22 |
| 2007/0082614 A1* | 4/2007 | Mock | H04W 88/02 | 455/41.2 |
| 2007/0106897 A1* | 5/2007 | Kulakowski | G06F 21/35 | 713/171 |
| 2007/0136585 A1* | 6/2007 | Diorio | G06F 21/35 | 713/168 |
| 2007/0197261 A1* | 8/2007 | Humbel | G06Q 30/00 | 455/558 |
| 2008/0076572 A1* | 3/2008 | Nguyen | G07F 17/32 | 463/42 |
| 2008/0162361 A1* | 7/2008 | Sklovsky | G06Q 20/32 | 705/65 |
| 2008/0169350 A1* | 7/2008 | Audebert | G06F 21/31 | 235/492 |
| 2008/0207169 A1* | 8/2008 | Park | G06F 21/73 | 455/411 |
| 2009/0023389 A1* | 1/2009 | Paryani | H04N 21/42226 | 455/41.2 |
| 2009/0041313 A1* | 2/2009 | Brown | H04M 1/05 | 382/124 |
| 2009/0112765 A1* | 4/2009 | Skowronek | G06Q 20/32 | 705/44 |
| 2009/0249478 A1* | 10/2009 | Rosener | G06F 21/31 | 726/19 |
| 2009/0287922 A1* | 11/2009 | Herwono | H04L 9/0822 | 713/155 |
| 2010/0042848 A1* | 2/2010 | Rosener | G06F 21/32 | 713/184 |
| 2010/0068997 A1* | 3/2010 | Dunko | H04W 4/001 | 455/41.1 |
| 2010/0146273 A1* | 6/2010 | Kang | H04L 9/3271 | 713/168 |
| 2010/0227553 A1* | 9/2010 | Charrat | G06Q 20/341 | 455/41.1 |
| 2010/0273517 A1* | 10/2010 | Pinheiro | H04B 1/036 | 455/522 |
| 2010/0292556 A1* | 11/2010 | Golden | A61B 5/7465 | 600/364 |
| 2010/0318794 A1* | 12/2010 | Dierickx | B60R 25/04 | 713/164 |
| 2011/0063098 A1* | 3/2011 | Fischer | G07C 9/00119 | 340/439 |
| 2011/0191186 A1* | 8/2011 | Levy | G06F 3/048 | 705/14.58 |
| 2011/0281544 A1* | 11/2011 | Pallota | H04M 1/72577 | 455/404.1 |
| 2011/0313922 A1* | 12/2011 | Ben Ayed | G06Q 20/108 | 705/42 |
| 2012/0040617 A1* | 2/2012 | Hsia | H04L 63/0869 | 455/41.3 |
| 2012/0060215 A1* | 3/2012 | Cui | H04W 12/06 | 726/19 |
| 2012/0064828 A1* | 3/2012 | Khan | H04L 63/0492 | 455/41.1 |
| 2012/0086272 A1* | 4/2012 | Chen | H02H 3/027 | 307/38 |
| 2012/0094597 A1* | 4/2012 | Tysowski | G06Q 30/06 | 455/41.1 |
| 2012/0116858 A1* | 5/2012 | Simmons, Jr. | G06Q 30/02 | 705/14.19 |
| 2012/0150601 A1* | 6/2012 | Fisher | G06Q 20/20 | 705/14.23 |
| 2012/0166810 A1* | 6/2012 | Tao | G06F 21/32 | 713/186 |
| 2012/0207305 A1* | 8/2012 | Gallo | G06Q 10/10 | 380/271 |
| 2012/0225639 A1* | 9/2012 | Gazdzinski | G06Q 10/08 | 455/410 |
| 2012/0246074 A1* | 9/2012 | Annamalai | G01S 1/68 | 705/44 |
| 2012/0265809 A1* | 10/2012 | Hanson | H04L 67/141 | 709/204 |
| 2012/0296708 A1* | 11/2012 | Bachmann | G06Q 20/127 | 705/13 |
| 2012/0323717 A1* | 12/2012 | Kirsch | G06Q 20/0855 | 705/26.1 |
| 2012/0324242 A1* | 12/2012 | Kirsch | G06Q 20/0855 | 713/189 |
| 2012/0326847 A1* | 12/2012 | Strauman | H04M 1/72525 | 340/10.4 |
| 2013/0040619 A1* | 2/2013 | Grube | H04L 12/1895 | 455/414.1 |
| 2013/0040661 A1* | 2/2013 | Grube | H04L 12/1895 | 455/456.3 |
| 2013/0041831 A1* | 2/2013 | Das | G06Q 20/20 | 705/72 |
| 2013/0073672 A1* | 3/2013 | Ayed | H04L 67/306 | 709/217 |

(56) References Cited

U.S. PATENT DOCUMENTS

| | | | |
|---|---|---|---|
| 2013/0080238 A1* | 3/2013 | Kelly | G07F 17/3255 705/14.31 |
| 2013/0132854 A1* | 5/2013 | Raleigh | G06F 3/0482 715/738 |
| 2013/0137376 A1* | 5/2013 | Fitzgerald | H04B 5/0056 455/41.3 |
| 2013/0227656 A1* | 8/2013 | Holtmanns | H04L 63/0892 726/4 |
| 2013/0316645 A1* | 11/2013 | Li | H04B 5/0031 455/41.1 |
| 2014/0019757 A1* | 1/2014 | Mehtala | G06F 21/33 713/168 |
| 2014/0047531 A1* | 2/2014 | Zaitsev | G06F 21/123 726/9 |
| 2014/0068654 A1* | 3/2014 | Marlow | H04L 65/4084 725/28 |
| 2014/0074637 A1* | 3/2014 | Hammad | G06Q 20/12 705/21 |
| 2014/0096215 A1* | 4/2014 | Hessler | H04L 63/0869 726/7 |
| 2014/0114716 A1* | 4/2014 | Flogel | G06Q 10/1095 705/7.19 |
| 2014/0128032 A1* | 5/2014 | Muthukumar | H04M 1/72569 455/411 |
| 2014/0154975 A1* | 6/2014 | Lambert | H04W 4/008 455/41.1 |
| 2014/0162598 A1* | 6/2014 | Villa-Real | H04M 1/66 455/411 |
| 2014/0187230 A1* | 7/2014 | Pallotta | H04M 1/72577 455/419 |
| 2014/0195654 A1* | 7/2014 | Kiukkonen | H04W 8/00 709/220 |
| 2014/0201815 A1* | 7/2014 | Van Nieuwenhuyze | G06F 21/6209 726/4 |
| 2014/0206346 A1* | 7/2014 | Kiukkonen | H04W 52/0229 455/426.1 |
| 2014/0207852 A1* | 7/2014 | Wang | G06F 3/0488 709/203 |
| 2014/0215621 A1* | 7/2014 | Xaypanya | H04L 63/145 726/23 |
| 2014/0278594 A1* | 9/2014 | Vivadelli | G06Q 10/02 705/5 |
| 2014/0282961 A1* | 9/2014 | Dorfman | H04L 63/0823 726/7 |
| 2014/0292636 A1* | 10/2014 | Rosener | G06F 3/0304 345/156 |
| 2014/0344904 A1* | 11/2014 | Venkataramani | G06F 21/35 726/5 |
| 2014/0359750 A1* | 12/2014 | Adams | G06F 21/74 726/16 |
| 2014/0368601 A1* | 12/2014 | deCharms | H04W 4/021 348/14.02 |
| 2014/0379575 A1* | 12/2014 | Rogan | G06Q 20/3278 705/44 |
| 2015/0004996 A1* | 1/2015 | Finlow-Bates | H04W 64/00 455/456.1 |
| 2015/0005981 A1* | 1/2015 | Grimm | G07C 5/008 701/1 |
| 2015/0017909 A1* | 1/2015 | Meunier | H04N 5/23229 455/41.1 |
| 2015/0019444 A1* | 1/2015 | Purves | G06Q 20/382 705/76 |
| 2015/0088754 A1* | 3/2015 | Kirsch | G06Q 20/0855 705/71 |
| 2015/0090786 A1* | 4/2015 | Surkau | G07C 9/00111 235/384 |
| 2015/0126113 A1* | 5/2015 | Cech | H04B 5/0012 455/41.1 |
| 2015/0135284 A1* | 5/2015 | Bogard | H04L 63/107 726/5 |
| 2015/0178723 A1* | 6/2015 | Khan | G06Q 20/3821 726/6 |
| 2015/0187151 A1* | 7/2015 | Lagerstedt | G07C 9/00111 340/5.61 |
| 2015/0189504 A1* | 7/2015 | Chew | H04W 12/04 713/168 |
| 2015/0198983 A1* | 7/2015 | Faith | G06F 1/1694 340/686.1 |
| 2015/0200925 A1* | 7/2015 | Lagerstedt | H04L 63/062 726/6 |
| 2015/0230760 A1* | 8/2015 | Schneider | G06F 19/3468 600/300 |
| 2015/0244699 A1* | 8/2015 | Hessler | H04W 12/06 726/7 |
| 2015/0249482 A1* | 9/2015 | Czaja | H04B 5/0031 455/41.1 |
| 2015/0249663 A1* | 9/2015 | Svigals | H04L 63/0853 726/7 |
| 2015/0312275 A1* | 10/2015 | Grosskopf | H04L 63/20 726/1 |
| 2015/0326610 A1* | 11/2015 | Bartoszewski | H04L 63/20 726/1 |
| 2015/0334513 A1* | 11/2015 | Lotito | H04M 1/7253 455/41.1 |
| 2015/0356289 A1* | 12/2015 | Brown | G06F 21/44 726/7 |
| 2016/0012445 A1* | 1/2016 | Villa-Real | G06Q 20/32 705/44 |
| 2016/0012465 A1* | 1/2016 | Sharp | G06Q 20/18 705/14.17 |
| 2016/0021102 A1* | 1/2016 | Palm | G06F 21/36 726/1 |
| 2016/0028798 A1* | 1/2016 | Agrawal | G06F 17/30702 707/751 |

* cited by examiner

MOBILE USER DEVICE AND METHOD OF COMMUNICATION OVER A WIRELESS MEDIUM

CROSS-REFERENCE TO RELATED APPLICATIONS

The contents of utility patent application, entitled "Authentication server for a probability-based user authentication system and method" by the present inventors, Ser No. 14/633,520, filed on the same day as this application with the United States Patent and Trademark Office; the contents of U.S. utility patent publication 2009/0249478 A1, entitled "USER AUTHENTICATION SYSTEM AND METHOD", filed on Mar. 31, 2008; and the contents of U.S. Pat. No. 8,009,874 B2, entitled "USER VALIDATION OF BODY WORN DEVICE", filed on Aug. 10, 2007 are incorporated herein by reference for all purposes to the extent that such contents is not inconsistent with the present application.

TECHNICAL FIELD

The present invention relates to the field of computer science and more particularly to near field wireless communications of mobile devices.

BACKGROUND

In the recent past, mobile devices, such as smart phones, tablet computers, laptop computers, wearable smart devices, smart watches, and personal digital assistants, became commonly used items in everyday life. Accordingly, those devices are taken along with its respective users during a multitude of daily activities and are being used for a steadily increasing number of applications.

In one exemplary application, mobile devices are used for authentication purposes, e.g., for granting security access to a restricted area, for granting access to secure information, or for payment purposes. In this context, the term "authentication" is understood as the act of providing to a computer-based receiver system that a user is who she or he claims to be. Details with regard to authentication procedures can be found in U.S. utility patent publication 2009/0249478 A1, mentioned in the preceding.

When used for authentication purposes, a mobile device may be equipped with an interface that allows near field communication (NFC), which type of communication is generally known as to reduce the risk of eavesdropping by a third party due to the low physical range of the wireless transmission. However, since as mentioned in the preceding, typical users carry their mobile devices with them wherever they go and thus to a multitude of locations, there still exists a risk that the mobile device is "scanned" by a malicious party and thus that confidential information is compromised by a successful scanning attempt.

For example, in particular in public buildings, such as airports, train stations, stadiums, or the like, it is conceivable that a malicious party carries a scanner and tries obtaining confidential information from the mobile device of a passerby who is in close proximity using the aforementioned NFC technology on enabled devices.

Accordingly, a mobile NFC enabled user device is needed that provides for increased security and privacy.

SUMMARY

The following summary of the present invention is provided to facilitate an understanding of some of the innovative features unique to the present invention and is not intended to be a full description. A full appreciation of the various aspects of the invention can be gained by taking the entire specification, claims, drawings, and abstract as a whole.

According to one aspect of the present invention, a mobile user device is provided and being configured for communication over a wireless medium.

In one non-limiting example, the mobile user device comprises a near field communication interface, in the following also referred to as "NFC interface", for at least sending response information to a receiver device in one or more near field transmissions. A communication control module is connected with said near field communication interface and is configured to control at least whether said response information is sent by said near field communication interface. The communication control module controls whether said response information is sent in dependence of at least a communication safety parameter.

The basic idea of one or more embodiments of the present invention is to improve the security of a near field communication enabled mobile user device by controlling the transmission of data by the NFC interface, based on a communication safety parameter. As discussed in more detail in the following, the communication safety parameter relates to the current safety or security of near field communication. In one embodiment, the communication safety parameter is automatically determined in dependence of external factors, such as past user behavior, authentication status, or predefined location or time based settings. The present invention thus provides improved security of an NFC enabled mobile user device, e.g., against an inadvertent disclosure of confidential information.

In the following explanation of the present invention according to the embodiments described, the terms "connected to" or "connected with" are used to indicate a data connection/transmission link between at least two components, units, devices, or modules. Such a connection may be direct between the respective components, units, devices, or modules or indirect, i.e. over intermediate components, units, devices or modules. The connection may be permanent or temporary; wireless or conductor based.

As discussed in the preceding, the present invention according to one aspect refers to a mobile user device, configured to communicate over a wireless communication medium. The mobile user device may be of any suitable type and in particular may comprise a computing unit having at least a processor with a suitable programming to provide the functionality of at least some of the modules described herein. The user device is mobile and thus is not required to be permanently connected to an external power source, such as an electric grid connection, during operation.

The mobile user device may, e.g., be a laptop computer, a tablet computer, a smart phone, a personal digital assistant, a toll tag, an ID badge or a wearable smart and/or computing device, such as for example a watch, a pendant, a headphone, a headset, a bracelet, an arm band, a body strap, an electronic textile, or a head-mounted device or display. The mobile user device may also be an embeddable tracker, which may be embedded in the body of a user, or in any other device, such as a laptop bag.

Certainly, it should be understood that the mobile user device may be a mobile NFC enabled device of any type. Accordingly, a person of ordinary skill would understand that the above list of exemplary mobile user devices is non-limiting and that further device types that comprise an NFC interface and that are known or being developed are encompassed by the present invention.

As discussed in the preceding, the mobile user device comprises at least a near field communication (NFC) interface and a communication control module. Certainly, the mobile user device may comprise further components, modules or units. For example, the mobile user device may comprise a housing, a battery, a power supply, or one or more user I/O interfaces, such as one or more of a touch screen, a keypad, a speaker, and a microphone. The mobile user device depending on the application of the device may also comprise further network communication interfaces, such as a Wi-Fi interface for communication according to at least one of the IEEE 802.11 standards, a cellular communication interface adapted for, e.g., one or more of the GSM, EV-DO, or LTE standards, a Bluetooth communication interface, or an interface for communication according to the IEEE 802.15 group of standards. Some further exemplary additional modules and components are described in further detail in the following description.

The near field communication interface is configured to provide response information to a receiver, also referred to as receiver device in the following description, in one or more near field wireless transmissions. In a further embodiment, the near field communication interface is additionally configured to receive information in an incoming near field wireless transmission, such as a response request of a receiver, which is discussed in more detail below.

In the context of the present explanation, the term "near field transmission" or "NFC transmission", refers to wireless communication, where no substantial electromagnetic far field is generated. An NFC transmission thus typically is provided by modulating an electric or magnetic field. The absence of an electromagnetic far field in NFC transmissions decreases the risk of eavesdropping on the transmission dramatically, in particular due to the resulting limited wireless range.

The near field communication interface may in one example be adapted to communicate according to a wireless NFC protocol, based on radio-frequency (RFID) communication, such as ISO/IEC 14443 and FeliCa. Suitable near field communication protocols include ISO/IEC 10892, ECMA-340, ISO/IEC 21481, ECMA-352, and GSMA NFC. In one further additional or alternative example, the near field communication interface is configured for electric-field transmission at 13.56 MHz. The NFC interface in another example comprises at least one antenna, suitable for near field transmission at the respective frequency.

The near field communication interface may be of active type, i.e., being powered by a power supply or battery of the mobile user device, or of passive type. In the latter case, the near field communication interface may be powered by a prior incoming transmission.

As discussed in the preceding, the near filed communication interface is configured to provide at least response information to the receiver device via one or more near field wireless transmissions. The response information in this context may be any type of information that can be transmitted in said one or more near field transmissions. For example, the response information may comprise user information, device information, digital authentication credentials, user login credentials, user payment data, credit card data, cryptographic information, a password, and/or a token.

In one non-limiting example, the response information is transmitted when a response request is received, e.g., by said receiver device. The response request in this case may be received by said near field communication interface or by a further communication interface of said mobile user device, e.g. a Wi-Fi communication interface, if present. Alternatively or additionally, the near field communication interface may be configured to periodically initiate a transmission of said response information with or without a prior response request.

In any case, the communication of the NFC interface is controlled by said communication control module, so that response information is only transmitted by said near field communication interface if "authorized" by said communication control module, even if a response request queries the mobile user device or a periodically scheduled transmission is due. The present invention thus advantageously reduces the risk of an inadvertent disclosure of information by a scanning attempt of a third party.

As discussed in the preceding, the communication control module is configured to control at least whether said response information is sent in dependence of said communication safety parameter. In the context of the present invention, the term "communication safety parameter" may comprise any parameter, information, or variable, referring to the safety of near field communication at present. For example, the communication safety parameter may comprise a binary variable, corresponding to either an "NFC safe/NFC enabled" state or an "NFC unsafe/NFC disabled" state, upon which the communication of the near field communication interface is controlled. The communication safety parameter in turn may, e.g., be determined according to an automatic and/or periodic communication safety determination, as discussed in detail in the following description.

To control, whether said response information is sent by the near field communication interface to the receiver device, the communication control module may in one example be connected with the near field communication interface to provide a signal to the NFC interface, which corresponds to the communication safety parameter. In another example, the communication control module may be configured to control the power supply to the near field communication interface according to the communication safety parameter. According to a further example, the communication control module may be configured to enable and disable a transmission shield in accordance with the communication safety parameter, that when enabled, prohibits or substantially attenuates the propagation of any near field transmission, that is emitted by the NFC interface. The transmission shield may, e.g., be mechanically movable to shield an antenna of the near field communication interface when enabled. The aforementioned examples comprising a transmission shield may be particularly suitable in case the near field communication interface is of passive type.

The receiver device may be of any suitable type for receiving said near field transmission, comprising the response information. For example, the receiver device may be a computer, a security access terminal, a payment terminal, a phone, a tablet computer, or a toll terminal.

According to one embodiment, the communication safety parameter is stored in the mobile user device. For example, the communication safety parameter may be stored in memory of the mobile user device and/or the communication control module, such as RAM or FLASH memory.

According to another embodiment, the communication control module is additionally configured to automatically determine said communication safety parameter from communication safety information. An automatic determination of the current safety without a user action being necessary further enhances the security of the user's confidential information. For example, the communication control module may be configured to determine the communication safety parameter automatically according to a predefined schedule, in regular intervals, or upon the detection of a change of location of the mobile user device. In one embodiment and in addition to the aforementioned automatic determination, a determination of the current communication safety parameter may also be initiated upon a user's request, e.g., using a user interface of the mobile user device, if present.

In the context of the present invention, the term "communication safety information" refers to any information or data, allowing to determine the current safety of near field communication. The communication safety information may in one example relate to an actual scanning risk, such as derived from information that the mobile user device currently is in a known unsafe location, where scanning occurs. In another example, the communication safety information may relate to a potential scanning risk, such as derived from information of a known time, where the user device may be exposed to scanning. The latter scenario may, e.g., be the case when commuting to or from work and being in close proximity to other vehicles.

In one further exemplary embodiment, the communication safety information comprises at least one of user probability information, time information, and location information.

In the context of the present invention, the term "user probability information" is understood as information, which is correlated to a likelihood or probability that the current user of the mobile user device is who she or he claims to be, namely its respective owner or an authorized user. The respective likelihood may in one example be determined automatically by an authentication server. Details of the determination of the current user probability and the operation of the corresponding authentication server can be found in U.S. utility patent application "Authentication server for a probability-based user authentication system and method" by the present inventors, Ser. No. 14/633, 520, filed on the same day as this application with the United States Patent and Trademark Office, which as mentioned in the preceding is incorporated herein by reference.

The term "time information" in the context of the present invention corresponds to a specific time of the day, week, month, or year; a time or date range, or other information that relates to time and/or date. The term "location information" in the present context corresponds to the physical location of the mobile user device. The location information may correspond to an absolute location, e.g., longitude and latitude of the user device, or a relative location, e.g., the distance of the user device from a further device or a given location, such as home or the user's workplace or the distance to a BLE (Bluetooth low energy) beacon or similar beacon. Location data may in case of a Wi-Fi or cellular enabled device also include information about the cells or Wi-Fi networks in range of the device, as used in Assisted-GPS applications.

According to another alternative or additional embodiment, the communication control module is further connected with a training database. The training database comprises one or more stored safety datasets, each having at least stored communication safety information. The stored communication safety information may for example comprise one or more of stored user probability information, stored time information, and stored location information. The communication control module in this embodiment may be configured to determine said communication safety parameter at least from said one or more stored safety datasets.

In a further embodiment, the communication control module is additionally configured to determine the communication safety parameter by comparing real-time data, corresponding to current communication safety information, with said one or more stored safety datasets of the training database.

By comparing real-time data comprising current communication safety information, such as current user probability information, current time information, or current location information, with the one or more stored safety datasets, a particularly reliable determination of the communication safety parameter is possible.

For example, in case the real-time data comprises current time/date data and at least one of the safety datasets comprises time information referring to a time of the day when the communication is generally considered safe, such as during the work hours, it is possible to enable the transmission of the response information automatically when considered safe. In another alternative or additional example, in case the real-time data comprises current location data and at least one of the safety datasets comprises location information of safe premises, such as the user's workplace or a particular retailer, it is possible to enable the transmission of the response information automatically in these locations.

It should be noted that the training database may have some stored safety datasets comprising time information, while other datasets comprise location information or user probability information. Also, some stored safety datasets may comprise more than one of said user probability, time, and location information. In the latter examples, the communication control module may be configured to compare the stored time, location, and probability information with corresponding time, location, and probability data of said real-time data to obtain a "match". In one embodiment the stored user probability information comprises one or more application threshold values. The current user probability information may comprise at least a user probability value.

Besides the real-time data, the safety datasets may certainly comprise further information, such as a prioritization value, or a stored safety parameter, as discussed in detail in the following. The one or more stored safety datasets may, e.g., be predefined or preset by the manufacturer, by a third party, such as a security provider or a crowd-sourcing provider, by the user of the mobile user device, and/or obtained from prior user behavior, as discussed in the following.

It should be noted that the real-time data may be provided in a data format that is directly comparable with the stored safety datasets. Otherwise, a data conversion module may be provided, that converts either the real-time data or the stored safety datasets to allow a comparison thereof by the communication control module.

The training database may be of any suitable type and may be comprised in a suitable memory, such as RAM, ROM, flash memory, a hard drive, a solid state drive, etc. In one example, the training database is comprised in the mobile user device. In another example, the training database is provided as a part of a remote server device, e.g., connected with said mobile user device over a Wi-Fi connection. The latter example may be useful when the device manufacturer or a third party, as discussed in the preceding, maintains the training database.

In another embodiment, the communication control module may be configured to set the communication safety parameter to allow the transmission of said response information in case said real-time data corresponds to one of said stored safety datasets. According to the present embodiment, the one or more stored safety datasets correspond to "whitelist"-entries, i.e. database entries corresponding to scenarios, where the communication is considered safe. For example, the training database may comprise datasets with stored location information, corresponding to locations, where the communication is considered safe. Alternatively or additionally, the training database may comprise user probability information, corresponding to a high level of probability, that the mobile user device currently is operated by its owner or an authorized user.

In an additional embodiment to the above, the communication control module may be configured to disallow the transmission of the response information in case the real-time data does not correspond to one of the stored safety dataset of the training database. This embodiment corresponds to a "default setting" of disabling near field communication in case no match for the real-time data is found in the training database.

It is noted that the stored safety datasets may, alternative to the above, correspond to "blacklist"-entries, i.e. database entries corresponding to scenarios, where the communication is considered unsafe. In this case, the aforementioned default setting may be enabling near field communication in case no match for the real-time data is found in the training database. The default setting may be predefined by the user, the manufacturer of the device, or a third party, as discussed in the preceding.

As discussed in the preceding, the one or more stored safety datasets may in one embodiment additionally comprise a stored safety parameter. The stored safety parameter in one example may be correlated with the stored communication safety information of the respective stored safety dataset.

In one exemplary embodiment, the stored safety parameter may correspond to one of the states of the communication safety parameter. For example, the stored safety parameter may correspond directly to the aforementioned "NFC safe" and "NFC unsafe" states of the communication safety parameter. According to the present embodiment, the one or more stored safety datasets may correspond to "whitelist" or "blacklist" entries, i.e. database entries corresponding to scenarios, where the communication is considered safe (whitelist entry) or unsafe (blacklist entry). For example, the training database may comprise a first safety dataset, where the stored safety parameter corresponds to an "NFC unsafe" state for a specific time period per day, and also comprise a second safety dataset where the stored safety parameter corresponds to an "NFC safe" state for a specific location. Certainly also here the stored safety datasets may additionally in one example comprise a prioritization value, which may be useful in case of eventual conflicting datasets.

Accordingly, in one further embodiment, the communication control module is configured to set the communication safety parameter to the stored safety parameter of the stored safety dataset, where the stored communication safety information corresponds to current communication safety information obtained from said real-time data.

In the case that no match is found in the training database and in another embodiment, the communication control module may set the communication safety parameter to the respectively selected default setting, as discussed in the preceding. For example, the communication control module may be configured to disallow the transmission of the response information in case the real-time data does not correspond to one of the stored safety dataset of the training database.

In another embodiment, in case the real-time data does not correspond to one of the stored safety dataset of the training database, the communication control module may be configured to query user safety input from a user interface unit of said mobile user device and to set the communication safety parameter according to said user safety input. For example, the communication control module may in this case show on a screen of the mobile user device various buttons, including "Allow NFC" and "Do not allow NFC". The present embodiment may be particularly useful in case the communication safety determination is performed when a response request is received from a receiver device, upon which the user then may make a selection according to the respective situation and the trust of the receiver device.

The user interface unit may be of any suitable type and may comprise a keypad, a keyboard, a touch screen, a touch pad, a mouse, a microphone, and/or a speaker. Reference is made to typical user interfaces of mobile devices.

In another embodiment, when said user safety input is queried, e.g., in case a response request is received from a receiver and the real-time data does not correspond to one of the stored safety datasets of the training database, the communication control module is additionally configured to generate a safety dataset using said user safety input and said real-time data and to store the generated safety dataset in said training database. The present embodiment accordingly allows to "train" the mobile user device with regard to the determination of the communication safety parameter and the preferences of the respective device user. In one further embodiment, the generation of said safety dataset is initiated upon a corresponding request by the user. For example, the user may select "Always allow NFC" or "Always disallow NFC" on a screen of the user interface to initiate the generation and storage of said new safety dataset.

As discussed in the preceding and in one exemplary embodiment, the stored safety parameter may correspond to one of the states of the communication safety parameter. It is however noted, that the present invention is not limited to this embodiment. Accordingly, the stored safety parameter may correspond to conditions, which are additional or alternative to the aforementioned "NFC safe" and "NFC unsafe" states.

In one further embodiment, the stored safety parameter of said one or more stored safety datasets may additionally correspond to a "user query condition". In this case, i.e. where said real-time data corresponds to one of said stored datasets and where the correlated stored safety parameter of the safety dataset corresponds to said user query condition, the communication control module may be configured to query said user interface unit of said mobile user device and to set the communication safety parameter according to said user safety input.

The present embodiment allows storing a safety dataset in said training database, which results in that the user is being queried to decide to allow or disallow near field communication each time at a given user probability, time, or location. This embodiment may be particularly useful in case the communication safety determination is performed when a response request is received from a receiver device.

The real-time data, discussed in the preceding, may be obtained from an external device, such as a remote real-time data server, e.g., connected with said mobile user device over a Wi-Fi or cellular connection.

In an alternative or additional embodiment, the real-time data is obtained by the communication control module from one or more real-time data input modules, such as a clock module and/or a positioning module.

In one embodiment, a clock module is arranged to provide said real-time data, which comprises current time information. The clock module may in particular comprise a real-time clock (RTC) module for providing current time information, corresponding to the current time and/or date. In a further alternative or additional embodiment, a positioning module provides real-time data, comprising current location information, corresponding to the current (absolute or relative) location of the mobile user device.

The positioning module may for example comprise a satellite positioning receiver, adapted for use with a satellite positioning system, such as GPS, GLONASS, GALILEO, IRNSS and/or BEIDOU/COMPASS. The positioning module may also be configured for assisted satellite positioning, such as in "Assisted GPS (A-GPS)".

According to a further exemplary embodiment, the positioning module is configured to determine the relative position or proximity to another device, such as to a wearable smart and/or to a computing device, e.g., a smart watch, a headphone, a bracelet, an arm band, a body strap, an electronic textile, a BLE (Bluetooth low energy) beacon or similar beacon, or a head-mounted device or display.

Certainly, the real-time data may comprise a combination of current user probability, current time, and current location information.

According to another embodiment, the one or more stored safety datasets each comprise at least stored user probability information, namely an application threshold value. The communication control module is configured obtain at least one of said stored safety datasets from said training database and to transmit an authentication request comprising at least the stored application threshold value of the obtained stored safety dataset(s) to an authentication server. The communication control module is further configured to determine said communication safety parameter from whether user authentication information is received from said authentication server.

The stored application threshold value, transmitted to the authentication server according to this embodiment may be used by the authentication server to compare the transmitted user probability information with a "current" user probability value, which relates to the "real-time" likelihood that the current user of the mobile device is the owner or an authorized user. In case the current user probability value matches or exceeds the transmitted stored application threshold value, user authentication information is returned to the communication control module. Accordingly, it is possible to set said communication safety parameter by determining, whether the user authentication information is received from said authentication server.

For example, in case the user authentication information is received, the communication safety parameter may be set to an "NFC safe" state by the communication control module, which as mentioned in the preceding, enables the near field communication. In another alternative or additional example, the communication safety parameter is set to "NFC unsafe" state in case no user authentication information is received.

The user authentication information may be of any suitable type and may comprise information corresponding to a "matched" condition, digital credentials, authenticating the user, a security token, and/or a cryptographic key, such as a PGP key. In one example, the user authentication information comprises digital credentials, authenticating the user. If no match is found, the authentication server in another example does not send any reply. In a further example, the authentication server in this case transmits information, corresponding to a "not matched"/"not authenticated" condition.

Details of the determination the (current) user probability value, the operation of the authentication server, and the comparison of the user probability value with said application threshold value can be found in the parallel U.S. utility patent application "Authentication server for a probability-based user authentication system and method", mentioned in the preceding. The operation of the communication control module according to the present embodiment may correspond to the operation of an authenticator or authenticator module of a user authentication procedure. The authentication server may be formed integrally with said mobile user device or arranged externally.

In one further embodiment, said one or more stored safety datasets each additionally comprise a stored safety parameter as discussed in the preceding.

In another exemplary embodiment, the mobile user device comprises a device motion detection module, connected with said near field communication interface to allow the transmission of said response information in case of the detection of predefined device motion. The present embodiment allows, e.g., to override the automatic setting of the communication control module in case the predefined device motion is detected, which may for example correspond to a specific gesture or a specific device orientation. The predefined device motion may be preset by the device manufacturer or predefined the user. The device motion detection module may be of any suitable type and may, e.g., comprise an accelerometer device and/or a gyroscope.

According to a second aspect of the present invention, a mobile user device is provided. The mobile user device according to the present aspect is configured to communicate over a wireless medium and comprises a near field communication interface for at least sending response information to a receiver in a near field transmission and a communication control module, connected with said near field communication interface to control whether said response information is sent. The communication control module is further connected to an authentication server for user authentication, wherein the communication control module is configured to allow said response information to be sent by said near field communication interface only in case of a valid user authentication by said authentication server.

The present embodiment provides a mobile user device, where the near field communication interface is controlled in dependence of a current user authentication. The operation of the communication control module may correspond to the operation of an authenticator or authenticator module of a user authentication process.

The term "valid user authentication" in this context relates to the user of the mobile user device being currently authenticated by the authentication server, i.e. that the current user of the device is an authorized user. To be authenticated by the authentication server, the user typically provides one or more of three factors to the authentication server, namely:
  something that the user knows (e.g. a password),
  something that the user has (e.g. ATM card), and
  something that the user is (e.g. fingerprint).

The authentication server may upon successful authentication provide digital credentials of the user. In some cases (Kerberos for example), a software/module "user agent"

retains the digital credentials (called tickets) and gives them directly to the authenticator as needed.

Examples of systems and methods for user authentication are disclosed in U.S. utility patent publication 2009/0249478 A1, entitled "USER AUTHENTICATION SYSTEM AND METHOD", filed on Mar. 31, 2008; U.S. Pat. No. 8,009,874 B2, entitled "USER VALIDATION OF BODY WORN DEVICE", filed on Aug. 10, 2007; and utility patent application, entitled "Authentication server for a probability-based user authentication system and method" by the present inventors, Ser. No. 14/633,520, filed on the same day as this application with the United States Patent and Trademark Office, mentioned in the preceding. The authentication server may be formed integrally with said mobile user device or arranged externally thereof.

In one embodiment of the present aspect, the communication control module may be configured to allow said response information to be sent only in case the user is successfully authenticated and wears a body worn device.

With regard to further embodiments of the above-mentioned second aspect, reference is made to the preceding description of the first aspect and the respectively discussed embodiments.

In another aspect, a computer-implemented method of communicating with a mobile user device over a wireless medium comprising a near field communication interface is provided. According to this aspect, the near field communication interface is controlled to provide response information in a near field transmission in dependence of a communication safety parameter.

With regard to further embodiments of the above method according to the present aspect, reference is made to the preceding description of the first aspect and the respectively discussed embodiments.

A computer program or module may be provided to enable a mobile user device and/or a processor to carry out the method discussed above. The computer program may be contained on a computer readable medium, such as a solid state, magnetic or optical storage device.

These and other aspects of the invention will be apparent from and elucidated with reference to the embodiments described hereinafter.

DETAILED DESCRIPTION OF PREFERRED EMBODIMENTS

Figure 1:
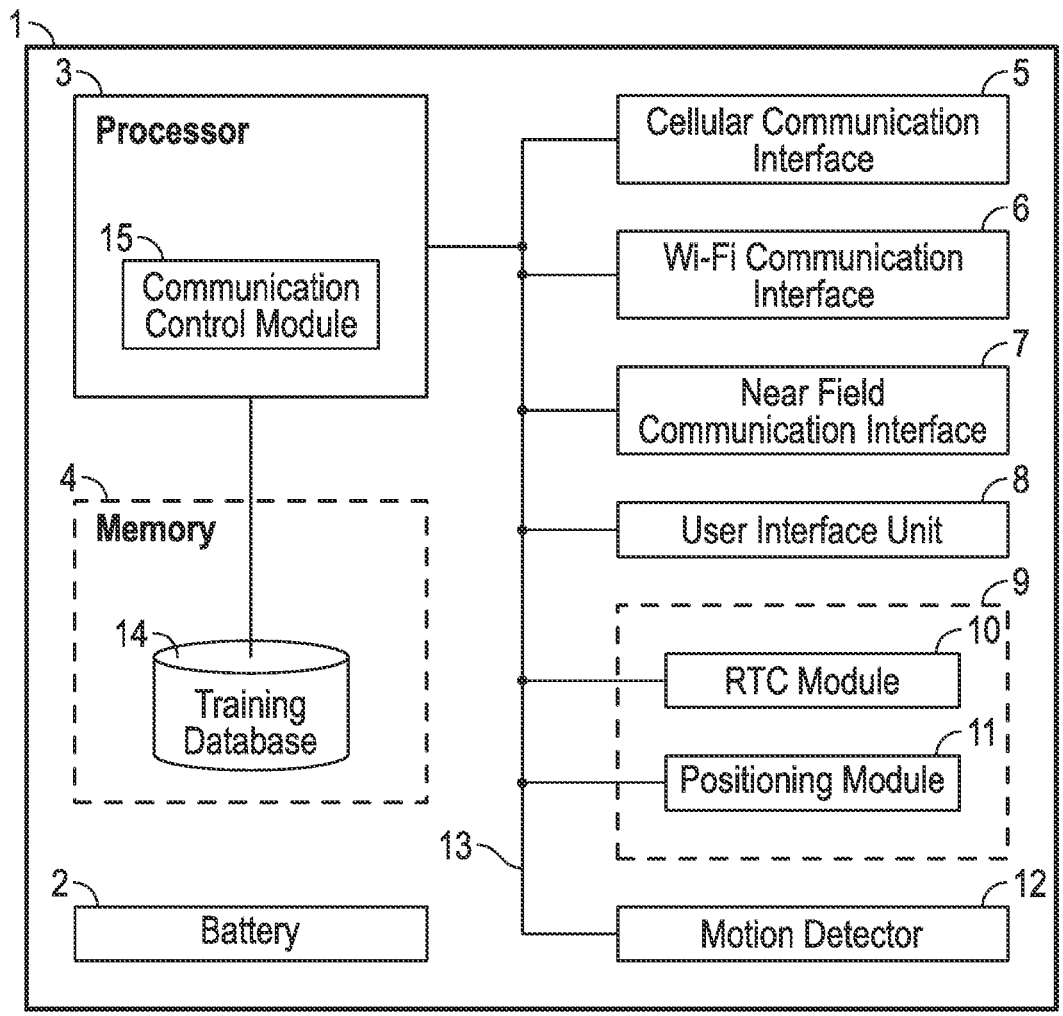
FIG. 1 shows a first embodiment of a mobile user device in a schematic block diagram.

Technical features described in this application can be used to construct various embodiments of mobile user devices for near field transmissions, according to embodiments described herein.

In the field of wireless communication and in particular in near field communications, also referred to as "NFC" in this context, it has been identified that a risk of "scanning" of a mobile NFC enabled device exists, which may lead to an inadvertent disclosure of confidential user data to an unauthorized and, e.g., malicious party.

In one approach, the present inventors have recognized that the risk of inadvertent disclosure of user data by near field communication may be reduced and thus the safety of an NFC enabled device increased by effectively controlling near field communications in such device.

By providing a mobile user device, as discussed in exemplary embodiments in the following, where the transmission of data, and in particular of response information, by an NFC interface is controlled based on a communication safety parameter, the safety of an NFC enabled mobile user device against an inadvertent disclosure of confidential information is improved. In one embodiment, the communication safety parameter is automatically determined in dependence of external factors, such as past user behavior, authentication status, or predefined location or time based settings.

Reference will now be made to the drawings in which the various elements of embodiments will be given numerical designations and in which embodiments will be discussed so as to enable one skilled in the art to make and use the invention.

Specific reference to components, units, modules, process steps, and other elements are not intended to be limiting. Further, it is understood that like parts bear the same reference numerals, when referring to alternate figures. It will be further noted that the figures are schematic and provided for guidance to the skilled reader and are not necessarily drawn to scale. Rather, the various drawing scales, aspect ratios, and numbers of components shown in the figures may be purposely distorted to make certain features or relationships easier to understand.

In the current explanation of the preferred embodiments, the terms "connected to" or "connected with" are used to indicate a data connection/transmission link between at least two components, units, devices, or modules. Such connection may be direct between the respective components, units, devices, or modules or indirect, i.e. over intermediate components, units, devices, or modules. The connection may be permanent or temporary; wireless or conductor based.

For example, a connection may be provided over a WAN, LAN, PAN, BAN, cellular network, Bluetooth network, Wi-Fi Network, and/or over a near field communications link using a corresponding suitable communications protocol.

FIG. 1 of the enclosed drawings shows a first embodiment of a mobile user device in a schematic block diagram. The mobile user device according to the present embodiment is a smart phone 1 and is accordingly powered by a rechargeable battery 2. The smart phone 1 further comprises a processor 3, a solid state memory unit 4, i.e. RAM, ROM and/or flash memory, a cellular communication interface 5 for communication using the GSM protocol, a Wi-Fi communication interface 6 for communication using one of the IEEE 802.11 protocols, and a near field communication interface 7. The near field communication (NFC) interface 7 according to the present embodiment is configured for electric-field transmission at 13.56 MHz using the ISO/IEC 14443 communication protocol. An antenna 16 (not shown in FIG. 1) is connected to the near field communication interface 7, which is configured to provide said electric-field transmission, but not a significant electromagnetic far field.

The smart phone 1 further comprises a user interface unit 8, which according to the present embodiment comprises a touch screen display, multiple buttons, and an audio I/O subsystem having a microphone and a speaker (all not shown). In addition thereto, the smart phone 1 comprises a real-time data input module 9 with a clock (RTC) module 10 and a positioning module 11. The RTC module 10 keeps track of current year, month, day, and time and comprises a battery-powered DS1307 serial real-time clock, available from Maxim Integrated, San Jose, Calif., USA. The positioning module 11 comprises an A-GPS (assisted GPS) UBX-M8030 receiver, available from u-blox AG, Thalwil, Switzerland. The positioning module 11 is configured to provide longitude and latitude information of the current position of the smart phone 1 in regular intervals.

The smart phone 1 also comprises a motion detector 12 for providing motion information. Motion detector 12 comprises an MPU-6500 motion-tracking device, marketed by InvenSense, Inc., San Jose, Calif., USA.

All of the aforementioned components 5-12 are connected with processor 3 over a communication bus 13 to exchange data and control the various functions of smart phone 1 and its components, e.g., using one of the I2C or SPI protocols. Although not shown, all of the components of smart phone 1 are build-in a portable, hand-held housing.

The memory unit 4 of the smart phone 1 is connected with processor 3 and comprises a training database 14 with multiple stored safety datasets. The training database 14 and more precisely the stored safety datasets are queried by a communication control module 15 of processor 3 according to the functionality discussed in detail with reference to FIGS. 2-4. The functionality of the communication control module 15 is provided by the processor 3 by executing machine-readable instructions according to program code or software, loaded from the memory unit 4.

Since the smart phone 1 comprises the aforementioned NFC interface 7, smart phone 1 may also be considered an "NFC enabled mobile user device". Accordingly, it is possible to exchange information between smart phone 1 and a further receiver device using near field transmissions when the smart phone 1 is brought into close proximity with the receiver device. While the distance of a successful near field transmission between smart phone 1 and receiver device may vary depending on environmental factors and the communication protocol used, a typical safe transmission distance is approx. 10 ft (3 m). Since the transmission distance thus is limited compared to, e.g., cell phone or Wi-Fi transmissions, near field communication is considered to be particularly suitable for security related applications, such as payment applications or security access applications.

Figure 2A:
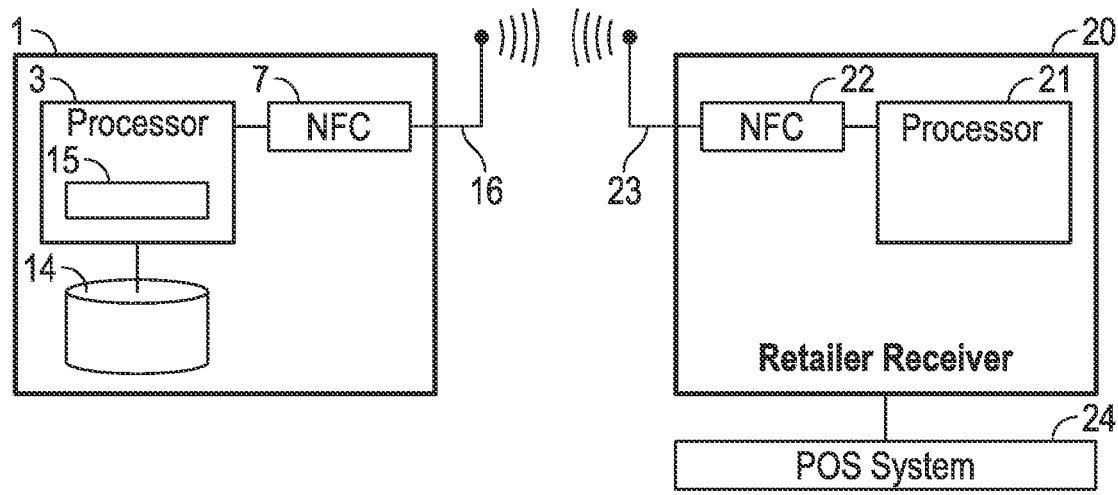
FIG. 2A shows the embodiment of FIG. 1 during operation with a retailer receiver device.
Figure 2B:
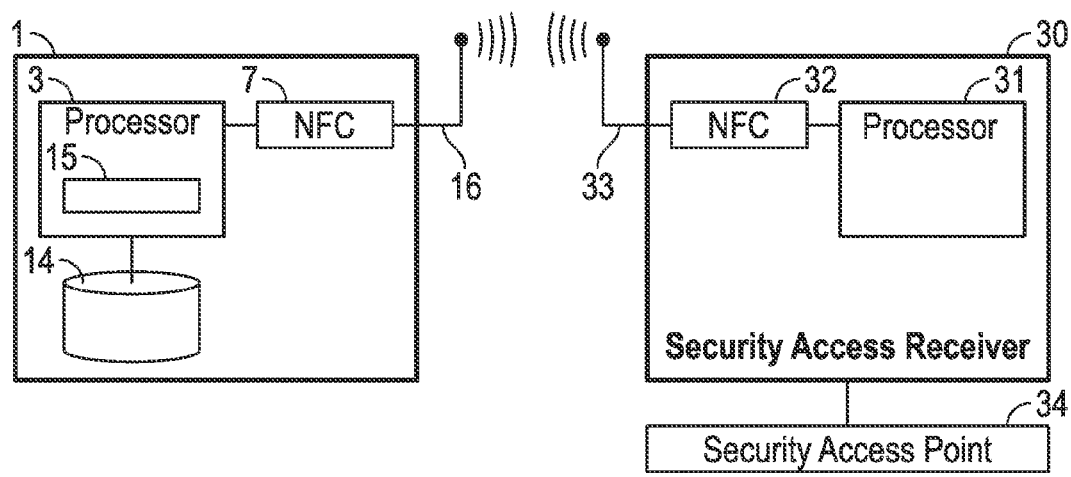
FIG. 2B shows the embodiment of FIG. 1 during operation with a security access receiver device.

FIG. 2A accordingly shows smart phone 1 according to the embodiment of FIG. 1 in a typical payment scenario. For illustration clarity purposes, only some of the components of smart phone 1 are shown in FIGS. 2A and 2B. Certainly however, the setup of smart phone 1 according to FIGS. 2A and 2B may correspond to the preceding discussion of the embodiment of FIG. 1.

Besides the smart phone 1, FIG. 2A shows a retailer receiver 20, comprising a processor 21 with suitable programming, a near field communication interface 22, and an antenna 23. The setup of the NFC interface 22 and the antenna 23 correspond to the setup of the respective components of smart phone 1. The retailer receiver 20 is connected with a typical point-of-sale (POS) system 24 to process purchases and payments.

During operation and once purchases are processed by the POS system 24, the user of smart phone 1 may bring the smart phone 1 in physical proximity with antenna 23 of the retailer receiver. In one typical example, the retailer receiver may transmit a response request in a first near field transmission in regular intervals, which queries the smart phone 1 to provide payment response information. The payment response information is then sent by smart phone 1 in another near field transmission back to the retailer receiver 20. Payment response information according to this embodiment may comprise credit or debit card information, banking information, and/or one or multiple payment token.

FIG. 2B illustrates another example of the operation of NFC enabled smart phone 1 in a security access scenario. The example of FIG. 2B corresponds to the example of FIG. 2A with the exception that instead of retailer receiver 20 and POS system 24, a security access receiver 30 and a security access point 34 is provided. Corresponding to FIG. 2A, the security access receiver 30 also in this example comprises a processor 31 with suitable programming, a near field communication interface 32, and an antenna 33. The security access point 34 is configured to provide access to a certain access restricted area within a building and is correspondingly connected with a door lock (not shown).

The operation and communication of the devices in this example corresponds generally to the operation, explained in the preceding with reference to FIG. 2A. The security access receiver 30 transmits a response request using NFC interface 32 and antenna 33. If a smart phone 1 is within transmission distance of the near field transmission and receives the response request, security response information is transmitted back to the security access receiver 30. Security response information according to the present example may comprise user information, device information, digital authentication credentials, user login credentials, a password, and/or one or more security token. The security access point 34 upon reception of the security response information checks the received information against a connected authentication database (not shown) and then provides security access if the credentials are considered to be valid, or if this is not the case, denies security access.

Figure 2C:
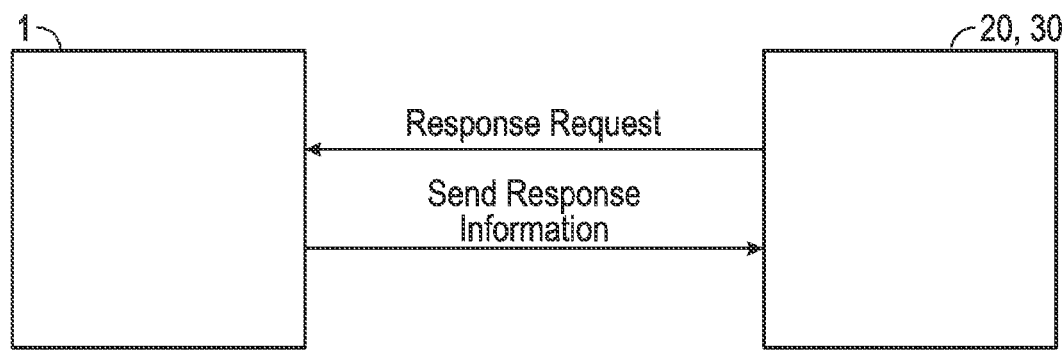
FIG. 2C shows an example of the transmission of information according to the embodiments of FIGS. 2A and 2B.

FIG. 2C illustrates the communication of the smart phone 1 with either retailer receiver 20 or security access receiver 30. As is apparent from FIG. 2C, the relatively basic operation shown may be vulnerable to an inadvertent disclosure of confidential information to an unauthorized receiver. Although some security is given due to the limited transmission range of the near field communication, a malicious party could retrieve confidential information by placing a receiver in close proximity to a user carrying his smart phone 1. A corresponding scenario in which smart phones are "scanned" is particularly conceivable in public buildings, such as airports and train stations, but also when using public transportation or even when passing by a malicious party's receiver during commute to or from work. It is noted that "response information" in this context may relate to the above mentioned payment and security response information, but may also relate to other response information, such as device information of the smart phone 1, e.g., a MAC address or other unique or quasi-unique device identifier. Certainly, in all mentioned cases, the response information may be confidential.

To reduce the risk of an inadvertent disclosure of confidential information in all of the above scenarios, the communication control module 15 of smart phone 1 according to the embodiment of FIG. 1 controls the operation of the NFC interface 7 in dependence of a communication safety parameter, stored in memory unit 4 of the smart phone 1. The communication safety parameter corresponds to at least two conditions, namely "NFC safe" and "NFC unsafe". In accordance with the current setting of the communication safety parameter, the operation of the near field communication interface 7 is controlled by the communication control module 15.

The communication safety parameter in turn is automatically determined by the communication control module 15 according to a periodically conducted communication safety determination. According to the present embodiment, the aforementioned safety datasets, stored in the training database 14, are compared with real-time data, obtained from the real-time data input module 9.

Figure 3:
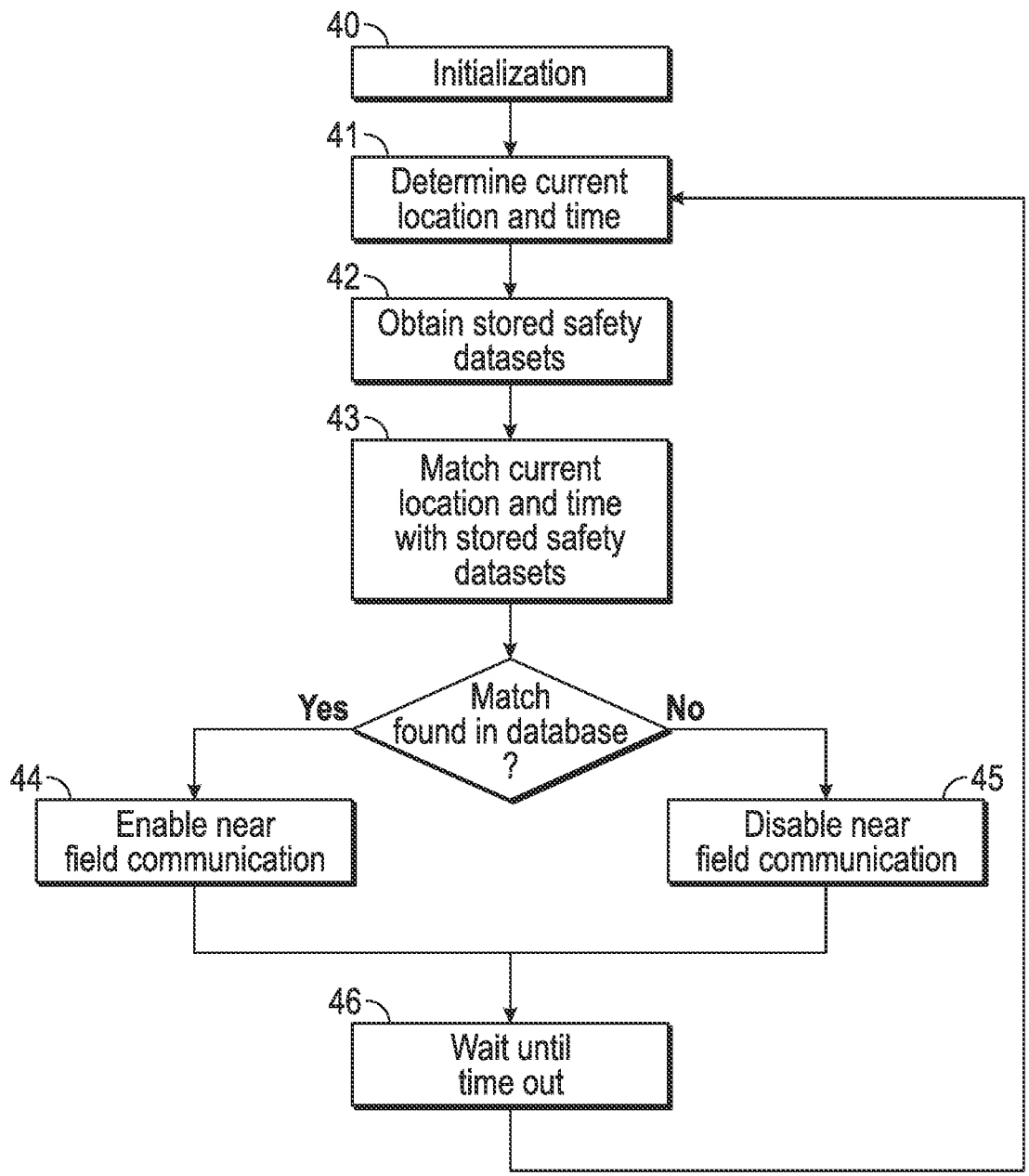
FIG. 3 shows a flow chart of the operation of the mobile user device of FIG. 1 during a first exemplary communication safety determination.

An exemplary embodiment of the operation of the smart phone 1 during a communication safety determination is illustrated in the flow chart of FIG. 3. For the present explanation, it is assumed that the user has preset multiple safety datasets in the training database 14. The safety datasets of the present embodiment each comprise stored communication safety information, i.e. stored time information or stored location information as follows:

| Stored time information | Stored location information |
|---|---|
|  | 36.987643°/−122.036219° and within 2 Miles of location |
| 9 am-5 pm (Mo-Fr) |  |
|  | 37.787993°/−122.407437° |
| All day (Sa, Sun) |  |
|  | 37.785508°/−122.403994° |
|  | 48.8606111°/2.337643° |
|  | 48.858370°/2.294481° |
| Feb. 5, 2016 |  |

Default time/date range: 5 Min.
Default location range: 200 ft.

As will be apparent from the above table, the training database 14 comprises safety datasets having various location information entries, provided as decimal degree latitude and longitude, as well as time/date information entries. Both, location information and time information datasets may be in the format of a time/location range or a single date/time or location, respectively. Certainly, even in the latter case, predefined default ranges of training database 14 allow for some deviation, e.g., with regard to time/date within 5 Min. from the set time and with regard to location within 200 ft. from the set location. In particular with regard to location, a default range may be useful due to the inherent error margin of typical GPS receivers.

Referring to FIG. 3, the operation of smart phone 1 and more precisely of communication control module 15 begins with an initialization of the smart phone 1 in step 40, i.e. upon powering the smart phone 1 on. During initialization, machine-readable instructions are loaded from the memory unit 4 and subsequently executed, which cause the processor 3 to provide the following functionality of the communication control module 15.

The default setting of the communication safety parameter according to the present embodiment is "NFC unsafe", which disables the near field communication interface 7 by powering off the interface 7.

In step 41, the communication control module 15 determines current time and location information by querying the RTC module 10 and the positioning module 11 of the real-time data input module 9. Once the current time and location information is provided to the communication control module 15, the training database 14 is queried in step 42 to provide stored safety datasets. The stored time and location information of the safety datasets is subsequently compared with the current time and location information, obtained from the real-time data input module 9 in step 43.

If a match is found, the near field communication interface 7 is enabled in step 44 by setting the communication safety parameter to "NFC safe", which causes to power on the NFC interface 7.

If no match is found in the safety datasets, the near field communication interface 7 remains powered off in step 45. Certainly, in case the near field communication interface 7 was enabled previously, the interface 7 is powered off in step 45.

In step 46, the communication safety determination ends. After a predefined time out, e.g., 30 seconds, the communication control module 15 again starts another communication safety determination in step 41.

As will be apparent from the above, the training database 14 according to the present embodiment comprises stored safety datasets, which correspond to "whitelist"-entries, i.e. database entries, which correspond to scenarios, where near field communication is considered safe. For example, the stored time information of one safety dataset of the training database 14 allows near field communication on weekdays between 9 am and 5 pm when the user of the smart phone 1 is at his workplace. Since the risk for scanning by a malicious party at the workplace may be considered to be low, the NFC interface 7 is enabled during work hours. This is particularly beneficial in case the user during his normal workday has to pass security access points 34 frequently, where access accordingly is granted without any manual action being necessary.

Figure 4:
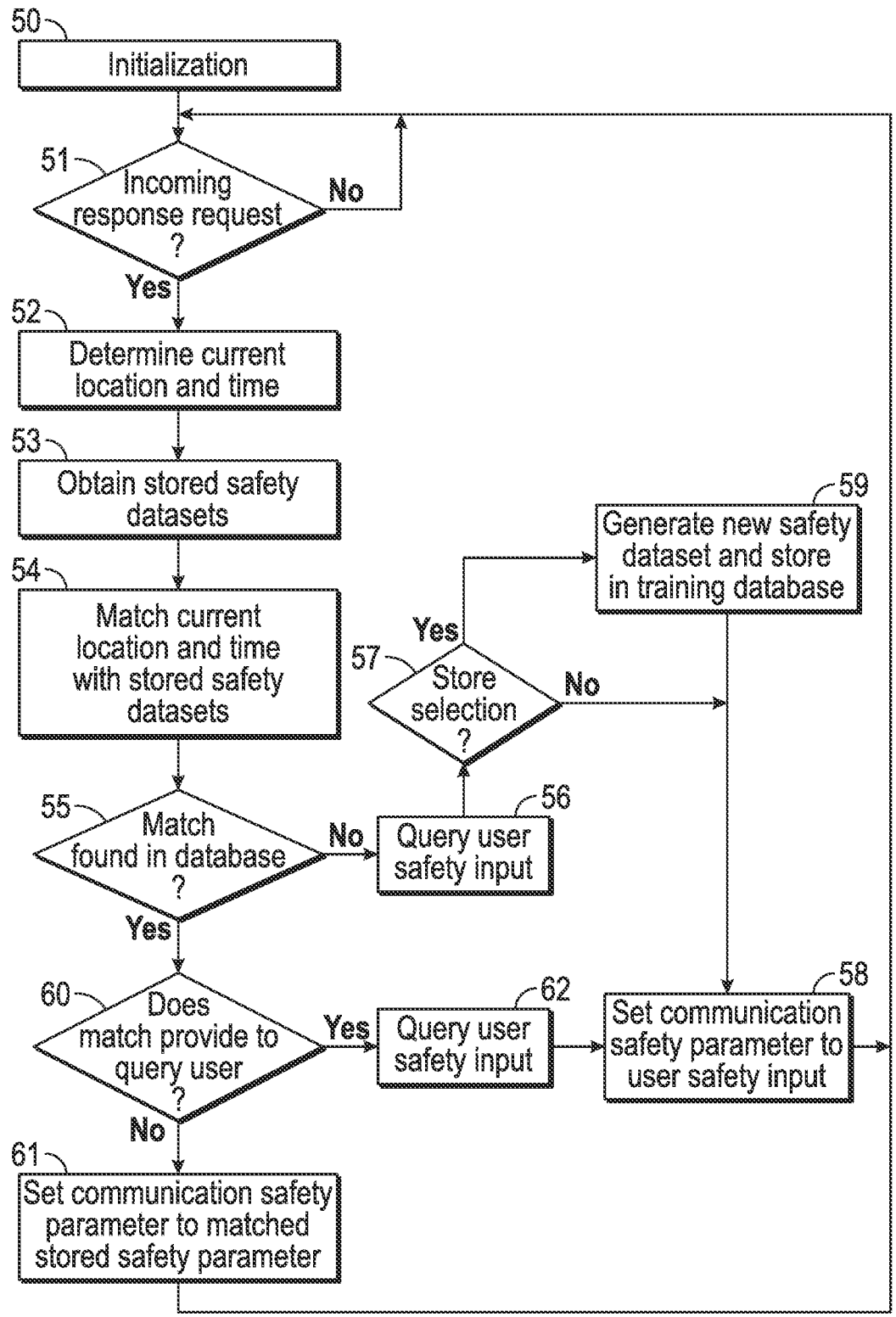
FIG. 4 shows another flow chart of the operation of the mobile user device of FIG. 1 during a second exemplary communication safety determination.

FIG. 4 shows another exemplary embodiment of the operation of the smart phone 1 during a communication safety determination in a flow chart. In the present embodiment and as will be apparent from the below table, each stored safety dataset of training database 14 further comprises a stored safety parameter. The stored safety parameter may correspond to three conditions, namely "Enable NFC", "Disable NFC", and "Query user". While the first two aforementioned conditions are directly used by the communication control module 15 to set the communication safety parameter, the "Query user" condition causes the communication control module 15 to obtain user safety input from the user interface unit 8.

| Stored time information | Stored location information | Stored safety parameter |
|---|---|---|
|  | 36.987643°/−122.036219° and within 2 Miles of location | Enable NFC |
| 9 am-5 pm (Mo-Fr) |  | Enable NFC |
|  | 37.787993°/−122.407437° | Disable NFC |

-continued

| Stored time information | Stored location information | Stored safety parameter |
|---|---|---|
| All day (Sa, Sun) | | Query user |
| | 37.785508°/−122.403994° | Enable NFC |
| | 48.8606111°/2.337643° | Disable NFC |
| | 48.858370°/2.294481° | Enable NFC |
| Feb. 5, 2016 | | Enable NFC |

Corresponding to the discussion of FIG. 3, the operation of smart phone 1 and more precisely of communication control module 15 in the present embodiment begins with an initialization of the smart phone 1 in step 50, i.e. upon powering the smart phone 1 on. Also here, machine-readable instructions are loaded from the memory unit 4 and subsequently executed, which cause the processor 3 to provide the following functionality of the communication control module 15.

According to the present embodiment, the near field communication interface 7 is powered on upon initialization of the smart phone 1. Accordingly in step 51 the NFC interface 7 waits to receive an incoming response request from a receiver. If this is the case, the NFC interface 7 forwards the response request to the communication control module 15, upon which the communication control module 15 determines current time and location information by querying the RTC module 10 and the positioning module 11 of the real-time data input module 9 in step 52.

Once the current time and location information is provided to the communication control module 15, the training database 14 is queried in step 53 to provide stored safety datasets. The stored time and location information of the safety datasets is subsequently compared with the current time and location information in step 54, obtained from the real-time data input module 9 previously.

In step 55, it is determined whether the current time and location matches one of the stored safety datasets. If this is not the case, the communication control module 14 in step 56 queries the user interface unit 8 to provide user safety input. In the present example, the display of the user interface unit 8 in step 56 allows user entry of: "Allow NFC" and "Ignore NFC", together with checkboxes for "Store selection as time entry" and "Store selection as location entry". In case none of the checkboxes are selected, the communication safety parameter is set to the corresponding user selection in step 58, i.e. "NFC safe" or "NFC unsafe". In the first case of "NFC safe" the NFC interface 7 responds to the response request by transmitting the response information. In the second case of the communication safety parameter being set to "NFC unsafe", no response information is transmitted. The operation then proceeds with step 51 and the NFC interface 7 again waits to receive an incoming response request from a receiver.

If the user has checked one of the checkboxes in step 56, a new safety dataset is generated by said communication control module 15 in step 59 using the respective current time information and/or the current location information as determined in step 52 and the user safety input, i.e. the selection of the user to allow or disallow near field communication at the respective time and/or location. The new safety dataset is then stored in training database 14. Certainly, also in this case, the communication safety parameter is subsequently set to the user safety input selection in step 58.

Referring again to step 55 and in case a match between the current time/current location and the stored safety datasets is found, it is determined in step 60 whether the stored safety parameter of the matched dataset corresponds to the aforementioned "Query user" condition. If this is the case, user input is queried in step 62 corresponding to the operation of step 56 with the exception that no checkboxes for storing the user selection are presented on the display of the user interface unit 8. The communication safety parameter is subsequently set in step 58 to the user safety input selection.

If in step 60, it is determined that the stored safety parameter does not correspond to "Query user", the communication safety parameter is set to the stored safety parameter of the matched dataset in step 61, upon which the NFC interface 7 responds to the response request or not. The operation also then proceeds with step 51 as described in the preceding.

As will be apparent from the above and in contrast to the embodiment of FIG. 3, the training database 14 according to the present embodiment comprises stored safety datasets, which correspond to "whitelist"-entries, as well as stored safety datasets, which correspond to "blacklist"-entries and "Query user" entries, allowing a high level of user customization of the described automatic determination of the communication safety parameter.

In addition to the above automatic determination of the communication safety parameter, the smart phone 1 allows for a manual "override" of the automatically derived settings of the communication safety parameter according to a predefined gesture of the user while holding smart phone 1. According to the present embodiment, the communication control module 15 determines a shaking motion of smart phone 1 via motion detector 12. If the shaking motion is determined, the communication safety parameter is set to the "NFC safe" condition for five minutes. Then, the setting of the communication safety parameter reversed to its previous setting.

Figure 5:
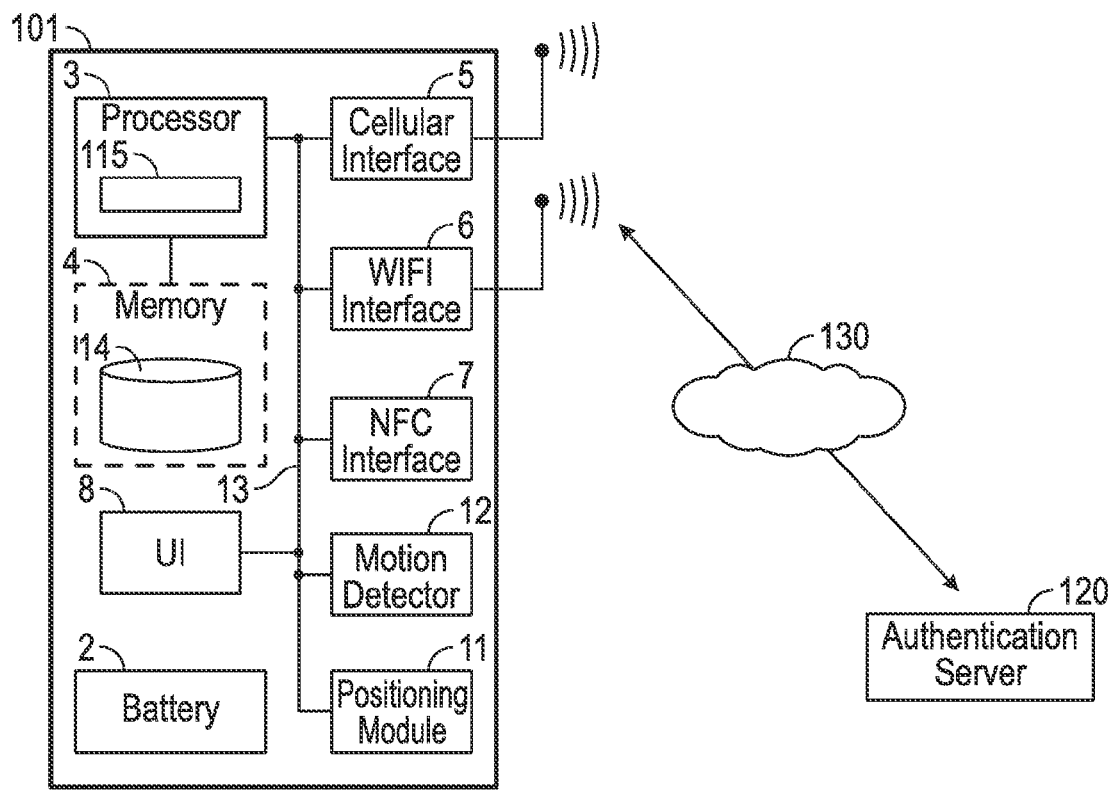
FIG. 5 shows a second embodiment of a mobile user device in a schematic block diagram.

FIG. 5 shows a second embodiment of a mobile user device, namely a smart phone 101, in a schematic block diagram. Smart phone 101 according to the present embodiment corresponds to smart phone 1 of FIG. 1, which the exception that RTC module 10 is omitted. The setup of the shown components corresponds to the setup of the respective components of the embodiment of FIG. 1.

According to the present embodiment, the training database 14 comprises multiple stored safety datasets, each comprising stored user probability information, namely an application threshold value together with a stored safety parameter. The stored application threshold value according to the present embodiment is a percentage user probability threshold, i.e. a percentage likelihood or probability that the current user of the smart phone 101 is who she or he claims to be, namely its respective owner or an authorized user. Correspondingly, the training database 14 comprises the following information:

| Stored application threshold value | Stored safety parameter |
|---|---|
| 80% (0.8) | Enable NFC |
| 60% (0.6) | Query user fingerprint or PIN to enable NFC |
| 40% (0.4) | Query user passphrase to enable NFC |

The threshold values of the stored safety datasets are in this embodiment predefined by the user of the smart phone 101, e.g., during the initial setup of the device.

According to the present embodiment, communication control module 115 is configured to contact authentication server 120, which is connected to the smart phone 101 over a WAN 130, such as the Internet. The connection to authentication server 120 is established over one of cellular communication interface 5 and Wi-Fi communication interface 6 in dependence of the availability of the respective network systems at the current location of smart phone 101.

In this embodiment, the authentication server 120 is configured to determine a "current" user probability value, corresponding to the current likelihood that the present user of the smart phone 101 is in fact its respective owner or an authorized user. Details with regard to the determination the current user probability value and the operation of the authentication server 120 according to this embodiment can be found in U.S. utility patent application entitled "Authentication server for a probability-based user authentication system and method" by the present inventors, Ser. No. 14/633,520, filed on the same day as this application with the United States Patent and Trademark Office and incorporated herein by reference.

The operation of the communication control module 115 of smart phone 101 according to the present embodiment may correspond to the operation of an authenticator or authenticator module according to the process, described in the referenced U.S. utility patent application.

Figure 6:
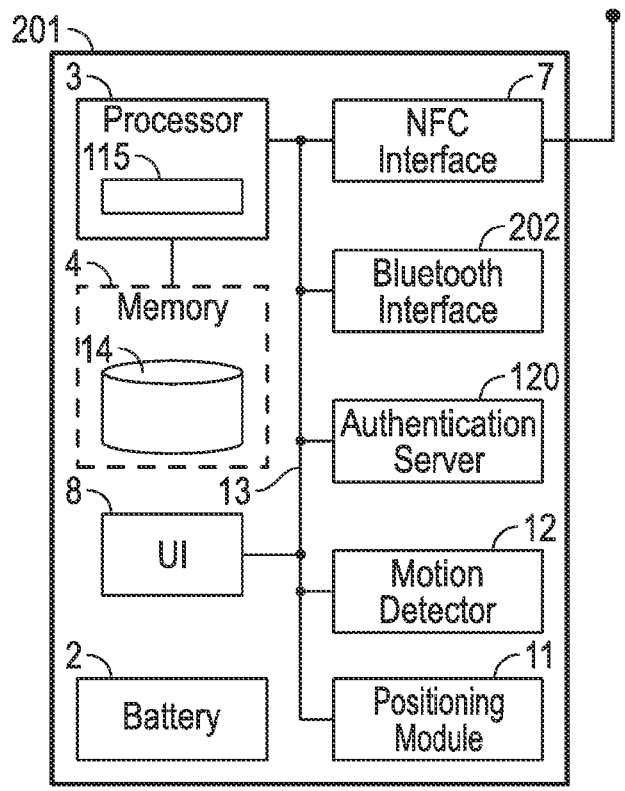
FIG. 6 shows a third embodiment of a mobile user device in a schematic block diagram.

FIG. 6 shows a further embodiment of a mobile user device, namely a wearable smart watch 201. The functional setup of the smart watch 201 corresponds largely to the setup of smart phone 100, explained with reference to FIG. 5, with the exception that authentication server 120 is formed integrally with smart watch 201 and that instead of the cellular and Wi-Fi communication interfaces 5 and 6, a Bluetooth communication interface 202 is provided. The communication between the communication control module 115 and the authentication server 120 is provided by communication bus 13.

Certainly, in addition to the mentioned differences in the functional setup, the form-factor of smart watch 201 and in particular of its housing (not shown) may differ significantly from smart phone 101 as will be apparent to one skilled in the art.

Figure 7:
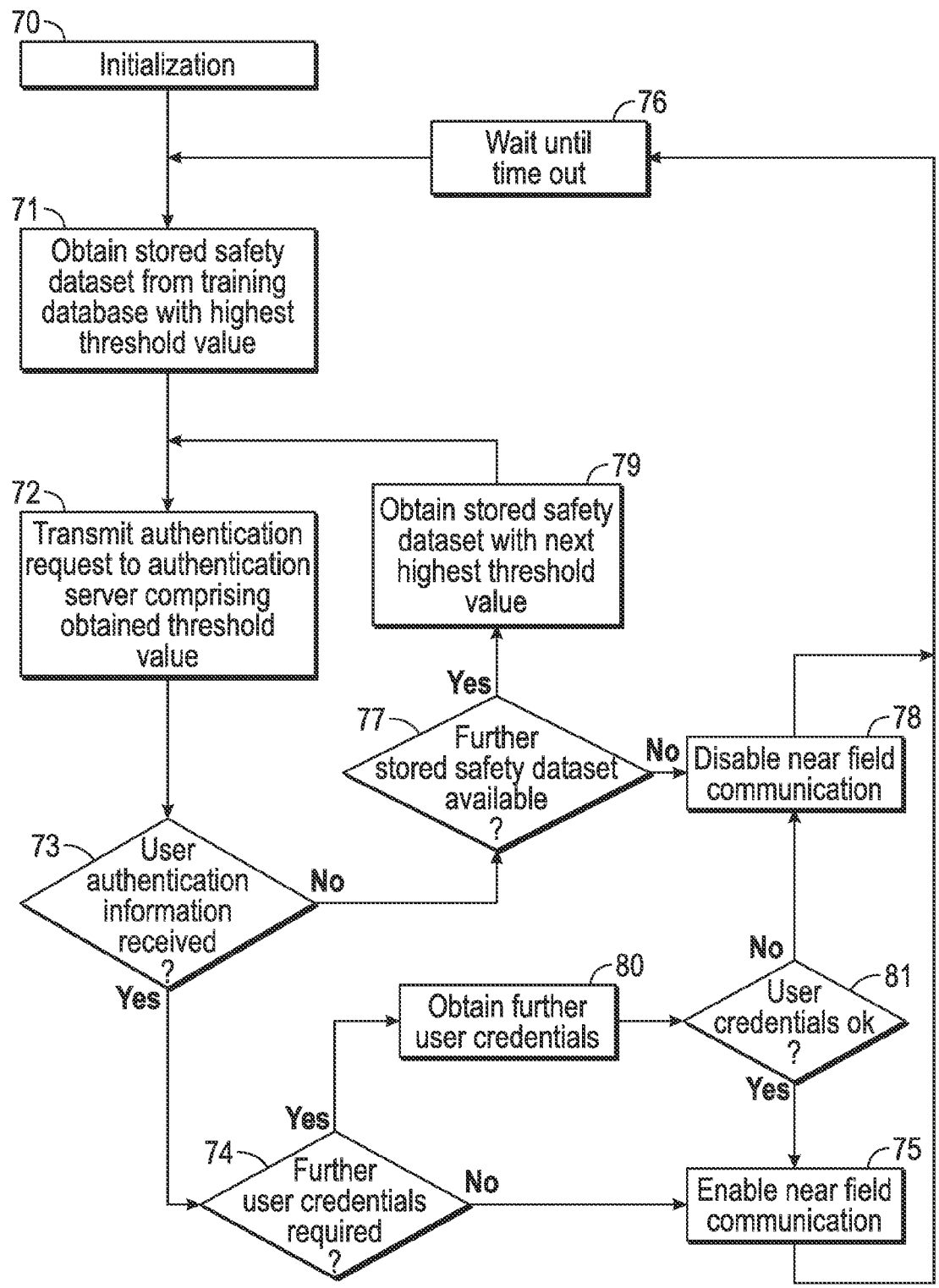
FIG. 7 shows a flow chart of the operation of the mobile user device of FIG. 5 and FIG. 6 during an exemplary communication safety determination.

FIG. 7 shows a flow chart of the operation of the mobile user device of FIG. 5 and FIG. 6 during an exemplary communication safety determination. It is noted that the operation during the communication safety determination does not depend on the location of authentication server 120. Accordingly, the following discussion of the operation of smart phone 101 may correspondingly apply to smart watch 201.

Corresponding to the preceding explanation of the embodiments of FIG. 3 and FIG. 4, the operation begins with initialization step 70, in which, e.g., the user switches on the smart phone 101. During initialization, machine-readable instructions are loaded from the memory unit 4 and subsequently executed, which cause the processor 3 to provide the following functionality of the communication control module 115.

In step 71, the communication control module 115 queries the training database 14 to obtain the stored safety dataset having the highest application threshold value. As will be apparent from the following discussion, the operation according to the present embodiment of the communication safety determination follows a prioritization according to the application threshold value of said stored safety datasets.

In step 72, the communication control module 115 transmits an authentication request to the authentication server 120 comprising a user ID of the authorized user of the smart phone, the determined application threshold value of the obtained safety dataset, and authenticator application data, namely the position of the smart phone 101, obtained from positioning module 11. According to the preceding table, the transmitted application threshold value corresponds to "80%".

Consequently to the transmission in step 72, the authentication server 120 determines the current or "real-time" user probability value. If the determined current user probability value matches or exceeds the transmitted application threshold value, the authentication server 120 transmits user authentication information. As mentioned in the preceding, details of the operation of authentication server 120 can be found in the discussed parallel U.S. utility patent application entitled "Authentication server for a probability-based user authentication system and method" by the present inventors.

The user authentication information in this embodiment comprises information corresponding to an "authenticated" condition. If no match is found, the authentication server 120 in this case transmits information, corresponding to a "not authenticated" condition.

In the following example, it is assumed that the authentication server 120 determines a current user probability value of 0.9 or 90%. Accordingly, user authentication information is transmitted to the communication control module 115 and the determination, whether the user authentication information is received by the communication control module 115 in step 73 provides a positive result.

In step 74, the communication control module 115 checks, whether the stored safety parameter of the obtained stored safety dataset provides to obtain further user credentials. Since this is not the case in the present example, the near field communication interface 7 is enabled in step 75 and the communication safety determination ends. After a predefined time out, e.g., 30 seconds, according to step 76, the communication control module 115 again starts another communication safety determination in step 71.

In case no user authentication is received in step 73, e.g., in case the current user probability value determined by the authentication server 120 is lower than 80%, the communication control module 115 in step 77, determines whether a further safety dataset is stored in the training database 14. If this is not the case, the near field communication interface 7 is disabled in step 78, upon which the communication safety determination ends. If another safety dataset is determined in step 77, the stored safety dataset having the next highest application threshold value is obtained and the comprised application threshold value is again transmitted to the authentication server in step 72 according to the preceding discussion.

Assuming in this example a current user probability value of 0.75 or 75%, user authentication credentials are transmitted to the communication control module 115 and the corresponding determination in step 73, as discussed in the preceding, provides a positive result. The determination in step 74 by the communication control module 115 whether the stored safety parameter of the obtained stored safety dataset provides to obtain further user credentials provides a positive result.

As can be seen from the above table of stored safety datasets, in case of a user probability of at least 60% (and <80%), further user credentials and in this case the user's fingerprint or the user's predefined device PIN is required. Accordingly in step 80, the further user credentials are queried from the user interface 8, which according to the present example comprises a touch screen for a PIN entry and a fingerprint scanner.

In step 81, it is determined whether the user credentials match the stored information. If this is the case, the near field communication interface is enabled in step 75 and the communication safety determination ends. Otherwise, the near field communication interface 107 is disabled in step 78.

Referring again to the above table of stored safety datasets, it is possible that for different levels of user probability, different user credentials need to be provided by the user to enable the near field communication interface 7. For example, in case of a relatively low user probability of only 40% (and <60%), the user needs to enter his passphrase instead of the mentioned provision of his PIN or fingerprint to enable the near field communication interface 7. In case a user probability value of smaller than 0.4 or 40% is determined, the NFC interface 7 stays disabled.

Certainly, the levels and necessary credentials may be set according to the desired safety and comfort levels.

Figure 8:
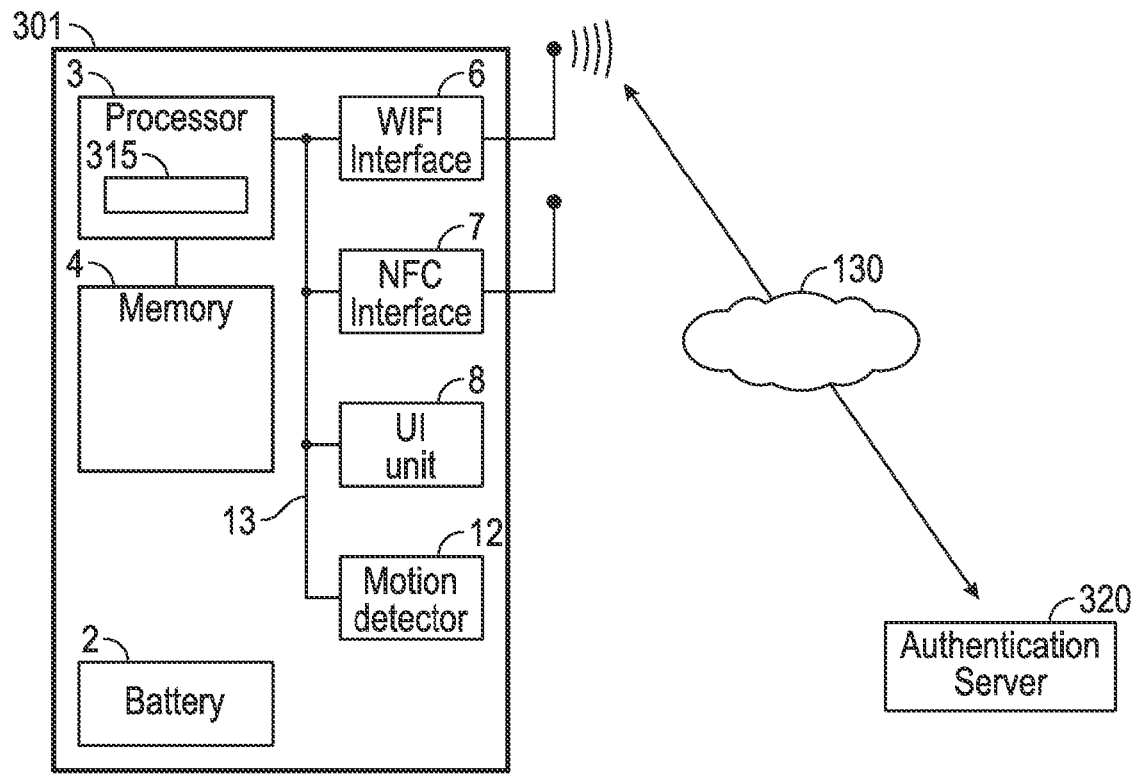
FIG. 8 shows another embodiment of a mobile user device in a schematic block diagram.

FIG. 8 shows a further embodiment of a mobile user device, namely a tablet computer 301 in a schematic block diagram. The functional setup of the tablet computer corresponds largely to the setup of smart phone 1, explained with reference to FIG. 1, with the exception that no training database 14, no real-time data input module 9, and no cellular communication interface 5 is provided.

Corresponding to the embodiment of FIG. 5, communication control module 315 is configured to connect with authentication server 320 over the Wi-Fi communication interface 6 and wide area network 130. Authentication server 320 according to this embodiment provides user authentication information in case the user has successfully authenticated himself to the authentication server 320.

The authentication server 320 upon successful authentication provides digital credentials of the user to the communication control module 315, upon which the communication control module 315 allows response information to be sent by the near field communication interface 7.

Examples of systems and methods for user authentication are disclosed in U.S. utility patent publication 2009/0249478 A1, entitled "USER AUTHENTICATION SYSTEM AND METHOD", filed on Mar. 31, 2008; and U.S. Pat. No. 8,009,874 B2, entitled "USER VALIDATION OF BODY WORN DEVICE", filed on Aug. 10, 2007, mentioned in the preceding. Both of these applications relate to user authentication that remains valid as long as the user wears a "body worn device", such as a headset.

Figure 9:
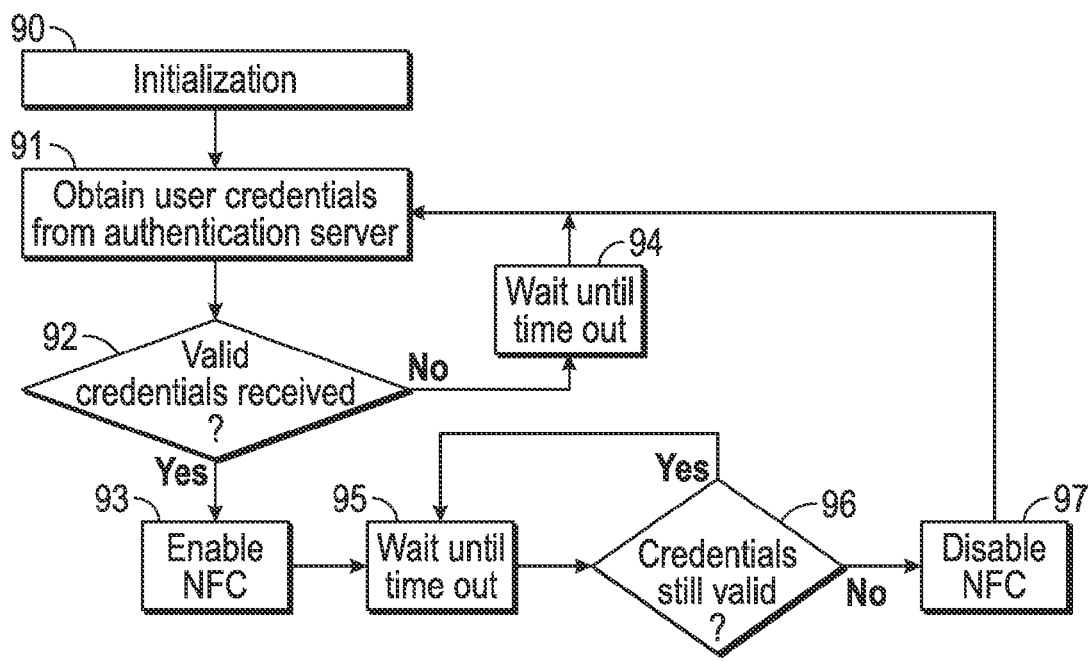
FIG. 9 shows an example of the operation of the embodiment of FIG. 8 during another exemplary communication safety determination in a further flow chart.

FIG. 9 shows the operation of tablet computer 301 in an exemplary communication safety determination. Corresponding to the preceding explanation of the embodiments of FIG. 3 and FIG. 4, the operation begins with initialization step 90, in which, e.g., the user switches on the tablet computer 301. Also here, machine-readable instructions are loaded from the memory unit 4 and subsequently executed, which cause the processor 3 to provide the following functionality of the communication control module 315.

Subsequently, the communication control module 315 queries the authentication server 320 to provide user credentials, corresponding to a currently valid user authentication in step 91.

In case such valid user credentials are received in step 92, such as in case the user is successfully authenticated to said authentication server 320 and still wears his headset, the communication control module 315 enables near field communication in step 93 by allowing said response information to be transmitted. If no valid user credentials are received, the communication control module 315 after a predefined time out, e.g., 30 seconds, according to step 94, starts another attempt to obtain valid user credentials in step 91.

In case of the provision of valid user credentials and a subsequent enablement of the near field communication in step 93, the communication control module 315 checks whether the user credentials are still valid in regular intervals in step 96, i.e. after a predefined time out according to step 95 of, e.g., 30 seconds. For this, the communication control module 315 queries again the authentication server 320. Depending on whether the user credentials are still valid, near field communication remains active, allowing the response information to be sent, or is disabled in step 97.

While the invention has been illustrated and described in detail in the drawings and foregoing description, such illustration and description are to be considered illustrative or exemplary and not restrictive; the invention is not limited to the disclosed embodiments.

For example, it is possible to operate the invention in an embodiment wherein

- the mobile user device 1, 101, 201, 301 is a laptop computer, a tablet computer, a smart phone, a personal digital assistant, a toll tag, an ID badge, or a wearable smart and/or computing device, such as a watch, a headphone, a bracelet, an arm band, a body strap, an electronic textile or a head-mounted device or display,
- the mobile user device 1, 101, 201, 301 is an embeddable tracker, which may be embedded in the body of its user, or in any other device, such as a laptop bag,
- the functionality of the communication control module 15, 115, 315, instead of being provided by executing software, being provided by dedicated circuitry formed integrally with processor 3 or externally thereof,
- the training database 14, instead of being formed integrally with the mobile user device 1, 101, 201, 301, being provided externally, e.g., on a remote server, connected with said mobile user device 1, 101, 201, 301 over a Wi-Fi or cellular connection,
- the one or more safety datasets, instead of being preset by the user, being preset by the device manufacturer, by a third party, such as a security provider, or by crowdsourcing,
- the positioning module 11 is additionally or alternatively configured to determine relative current location information, such as the proximity of the mobile user device 1, 101, 201, 301 to a further device or a given location, such as the proximity or distance to a BLE (Bluetooth low energy) beacon or similar beacon, and the training database 14 comprises safety datasets having relative stored location information,
- the security access point 34, instead of providing access to a certain access restricted area within a building, provides access to a further device, such as a computer, a vehicle or an appliance, and/or
- the training database 14, instead of comprising "whitelist"-entries, comprises "blacklist"-entries, i.e. database entries corresponding to scenarios, where the communication is considered unsafe.

Other variations to the disclosed embodiments can be understood and effected by those skilled in the art in practicing the claimed invention, from a study of the drawings, the disclosure, and the appended claims. In the claims, the word "comprising" does not exclude other elements or steps, and the indefinite article "a" or "an" does not exclude a plurality. A single processor, module or other unit may fulfill the functions of several items recited in the claims.

The mere fact that certain measures are recited in mutually different dependent claims or embodiments does not indicate that a combination of these measured cannot be used to advantage.

A computer program may be stored/distributed on a suitable medium, such as an optical storage medium or a solid-state medium supplied together with or as part of other hardware, but may also be distributed in other forms, such as via the Internet or other wired or wireless telecommunication systems. Any reference signs in the claims should not be construed as limiting the scope.

What is claimed is:

1. A mobile user device, configured to communicate over a wireless medium, comprising
   a near field communication interface for at least sending response information to a receiver in one or more near field transmissions; and
   a communication control module, connected with said near field communication interface; wherein
   the communication control module is configured to control whether said response information is sent by said near field communication interface in dependence of at least a communication safety parameter and
   wherein said communication control module is connected with a training database; said training database having one or more stored safety datasets, each comprising at least stored communication safety information; wherein said communication control module is connected with said training database and is configured to determine said communication safety parameter at least from said one or more stored safety datasets.

2. The mobile user device according to claim 1, wherein said communication control module is configured to automatically determine said communication safety parameter from communication safety information.

3. The mobile user device according to claim 1, wherein said communication control module is configured to determine said communication safety parameter from communication safety information, comprising at least one of user probability information, time information, and location information.

4. The mobile user device according to claim 1, wherein said communication control module is configured to determine said communication safety parameter by obtaining at least one of said stored safety datasets from said training database; obtaining real-time data, corresponding to current communication safety information; and comparing said real-time data with said at least one stored safety datasets of said training database.

5. The mobile user device according to claim 1, further comprising said training database.

6. The mobile user device according to claim 4, wherein the communication control module is configured to set said communication safety parameter to allow the transmission of said response information in case said real-time data corresponds to one of said stored safety datasets.

7. The mobile user device according to claim 4, wherein one or more of said stored safety datasets each additionally comprise a stored safety parameter.

8. The mobile user device according to claim 7, wherein in case said real-time data corresponds to one of said stored safety datasets, the communication control module is configured to set said communication safety parameter to the stored safety parameter of the associated stored safety dataset.

9. The mobile user device according to claim 7, further comprising a user interface unit to obtain user safety input.

10. The mobile user device according to claim 9, wherein in case said real-time data does not correspond to one of said stored safety datasets, said communication control module is additionally configured to query said user interface unit to provide said user safety input; and to set said communication safety parameter according to said user safety input.

11. The mobile user device according to claim 10, wherein in case said real-time data does not correspond to one of said stored safety datasets, said communication control module is additionally configured to generate a safety dataset using said user safety input and said real-time data; and to store the generated safety dataset in said training database.

12. The mobile user device according to claim 9, wherein in case said real-time data does correspond to one of said stored safety datasets and said stored safety parameter corresponds to a user query condition, said communication control module is additionally configured to query said user interface unit to provide said user safety input; and to set said communication safety parameter according to said user safety input.

13. The mobile user device according to claim 4, further comprising a clock module for providing said real-time data to said communication control module; said real-time data comprising current time information.

14. The mobile user device according to claim 4, further comprising a positioning module for providing said real-time data to said communication control module; said real-time data comprising current location data.

15. The mobile user device according to claim 1, wherein one or more of said stored safety datasets each comprise at least an application threshold value and said communication control module is configured to
   obtain at least one of said one or more stored safety datasets from said training database,
   transmit an authentication request comprising at least the application threshold value of the obtained at least one stored safety dataset to an authentication server, and
   determine said communication safety parameter from whether user authentication information is received from said authentication server.

16. The mobile user device according to claim 1, further comprising a device motion detection module, connected with said near field communication interface to allow the transmission of said response information in case of the detection of a predefined device motion.

17. A mobile user device, configured to communicate over a wireless medium, comprising
   a near field communication interface for at least sending response information to a receiver in a near field transmission; and
   a communication control module, connected with said near field communication interface to control whether said response information is sent;
   said communication control module being further connected to an authentication server for user authentication; wherein
   the communication control module being configured to receive user credentials from the authentication server, which user credentials correspond to a valid user authentication, and in case the user credentials are received, to allow said response information to be sent by said near field communication interface.

18. A computer-implemented method of communicating with a mobile user device over a wireless medium; said mobile user device comprising a near field communication interface; wherein the near field communication interface is controlled to provide response information in a near field transmission in dependence of a communication safety parameter, said communication safety parameter being determined from one or more safety datasets, stored in a training database.

19. A non-transitory machine-readable recording medium including contents that are configured to cause a mobile user device to conduct the method of claim 18.

* * * * *